(12) United States Patent
Jones (10) Patent No.: US 10,575,592 B1
(45) Date of Patent: Mar. 3, 2020

(54) LACE TIGHTENING APPARATUS AND METHOD

(71) Applicant: Charles M Jones, Woodridge, IL (US)

(72) Inventor: Charles M Jones, Woodridge, IL (US)

( * ) Notice: Subject to any disclaimer, the term of this patent is extended or adjusted under 35 U.S.C. 154(b) by 89 days.

(21) Appl. No.: 15/920,557

(22) Filed: Mar. 14, 2018

(51) Int. Cl.
*A43C 11/16* (2006.01)
*A43C 7/00* (2006.01)
*F16G 11/10* (2006.01)

(52) U.S. Cl.
CPC .............. *A43C 11/165* (2013.01); *A43C 7/00* (2013.01); *F16G 11/106* (2013.01)

(58) Field of Classification Search
CPC ........ A43C 11/165; A43C 7/00; F16G 11/106
See application file for complete search history.

(56) References Cited

U.S. PATENT DOCUMENTS

| | | | | |
|---|---|---|---|---|
| 1,481,903 | A * | 1/1924 | Hart | A43C 7/00 24/712.6 |
| 3,430,303 | A * | 3/1969 | Wakefield | A43C 7/00 24/712.3 |
| 3,738,027 | A * | 6/1973 | Schoch | A43B 1/0054 36/50.1 |
| 4,967,454 | A | 11/1990 | Elieff | |
| 6,588,078 | B2 | 7/2003 | Writt et al. | |
| 7,076,843 | B2 * | 7/2006 | Sakabayashi | A43C 7/00 24/68 SK |
| 7,096,559 | B2 * | 8/2006 | Johnson | A43B 11/00 29/433 |
| 7,648,404 | B1 * | 1/2010 | Martin | B63B 35/7936 114/39.19 |
| 7,721,468 | B1 * | 5/2010 | Johnson | A43C 1/06 36/118.1 |
| 7,841,631 | B2 | 11/2010 | Holmes et al. | |
| 7,954,204 | B2 * | 6/2011 | Hammerslag | A43B 5/16 24/68 SK |
| 7,958,654 | B2 | 6/2011 | Reagan et al. | |
| 7,992,261 | B2 * | 8/2011 | Hammerslag | A43B 5/16 24/68 SK |
| 8,091,182 | B2 * | 1/2012 | Hammerslag | A43B 5/16 24/68 SK |
| 8,381,362 | B2 * | 2/2013 | Hammerslag | A43B 5/1666 24/68 SK |
| 8,516,662 | B2 | 8/2013 | Goodman et al. | |
| 8,713,820 | B2 | 5/2014 | Kerns et al. | |
| 9,101,181 | B2 * | 8/2015 | Soderberg | A43C 11/165 |
| 9,125,455 | B2 | 9/2015 | Kerns et al. | |
| 9,179,729 | B2 | 11/2015 | Cotterman et al. | |
| 9,339,082 | B2 * | 5/2016 | Hammerslag | A43B 5/16 |
| 9,365,387 | B2 * | 6/2016 | Beers | A61F 5/028 |
| 9,375,053 | B2 | 6/2016 | Burns et al. | |
| 9,402,431 | B1 | 8/2016 | Orsburne | |
| 9,408,437 | B2 * | 8/2016 | Goodman | A43C 11/165 |
| 9,439,477 | B2 | 9/2016 | Neiley | |
| 9,516,923 | B2 * | 12/2016 | Capra | A44B 11/25 |
| 9,532,626 | B2 * | 1/2017 | Lovett | A43C 11/20 |
| 9,532,893 | B2 | 1/2017 | Beers et al. | |

(Continued)

*Primary Examiner* — Robert Sandy
*Assistant Examiner* — Louis A Mercado (57) ABSTRACT

An apparatus and method for aiding a handicapped person or a child to tighten the laces on shoes and other forms of wearing apparel with only one finger. If a long handled hook is used the person does not even have to bend over to fasten the laces. Even an able bodied person will be able to fasten shoes, or other apparel faster than the current process.

8 Claims, 8 Drawing Sheets

(56) References Cited

U.S. PATENT DOCUMENTS

| | | | |
|---|---|---|---|
| 9,578,926 B2 * | 2/2017 | Alt | A43C 11/20 |
| 9,610,185 B2 * | 4/2017 | Capra | A61F 5/0102 |
| 9,629,417 B2 | 4/2017 | Cavanagh et al. | |
| 9,629,418 B2 * | 4/2017 | Rushbrook | A43C 11/22 |
| 9,681,705 B2 | 6/2017 | Trudel et al. | |
| 9,693,605 B2 * | 7/2017 | Beers | A61F 5/028 |
| 9,706,814 B2 | 7/2017 | Converse et al. | |
| 9,737,115 B2 | 8/2017 | Soderberg et al. | |
| 9,743,714 B2 * | 8/2017 | Hammerslag | A43B 5/16 |
| 9,770,070 B2 | 9/2017 | Cotterman et al. | |
| 9,861,164 B2 * | 1/2018 | Beers | A43B 3/0005 |
| 9,867,430 B2 * | 1/2018 | Hammerslag | A43B 5/1666 |
| 9,872,790 B2 | 1/2018 | Capra et al. | |
| 2006/0021204 A1 * | 2/2006 | Young | A43C 7/00 |
| | | | 24/712.4 |
| 2006/0168784 A1 * | 8/2006 | Ahn | A43C 7/08 |
| | | | 24/712.5 |
| 2011/0113606 A1 * | 5/2011 | Sloan | A43B 3/0052 |
| | | | 24/713.4 |
| 2014/0290014 A1 * | 10/2014 | Myrick | A43C 11/165 |
| | | | 24/712.2 |

* cited by examiner

LACE TIGHTENING APPARATUS AND METHOD

BACKGROUND

It is difficult to determine the exact history of shoelaces. Archaeological records of footwear are rare because shoes were generally made of materials that deteriorated readily. The oldest piece of leather footwear in the world known to contemporary researchers is a 5,500-year-old leather shoe that was found in 2008 in a cave in Armenia. The shoes were bound with "shoelaces" made of lime bark string.

There are other documented examples of medieval footwear with shoelaces dating from as far back as the 12th century, which clearly show the lacing passing through a series of hooks or eyelets down the front or side of the shoe.

Many contemporary shoes still use shoelaces which enable a user to distribute the tension across the top of the foot. The free ends of the shoelaces are typically tied into a bow shaped knot. However, this type of shoe fastening has several drawbacks. One problem is that the bow knot will often become inadvertently loosened and untied when walking. Another drawback is that some elderly and physically impaired folks do not have the luxury of being able to bend over and tie their shoes. Some folks do not even have the required manual dexterity to tie a knot of any type. Many children are unable to tie the laces. Still other folks may only have one hand which would also greatly handicap them when attempting to tie laced shoes. There are many lace winding mechanisms in the prior art but none are easily used by a handicapped person. The same problems hold true for some orthotic and prosthetic devices that require laces to be tightened.

PRIOR ART

The following representative sample of the prior art reveals many devices of various degrees of complexity to take the tension off the bow knot to keep a laced shoe tied. Most require the user to bend over, pass the laces through some passageways, and tie a bow knot. Some have mechanisms to lock the bow knot. They require a good deal of manual dexterity to operate the device.

There is a voluminous history of reel based manual lace winding mechanisms. For example reference some U.S. Patents just from 2011 to 2018:
U.S. Pat. No. 7,954,204
U.S. Pat. No. 7,992,261
U.S. Pat. No. 8,091,182
U.S. Pat. No. 8,381,362
U.S. Pat. No. 8,516,662
U.S. Pat. No. 8,713,820
U.S. Pat. No. 9,101,181
U.S. Pat. No. 9,125,455
U.S. Pat. No. 9,179,729
U.S. Pat. No. 9,375,053
U.S. Pat. No. 9,402,431
U.S. Pat. No. 9,408,437
U.S. Pat. No. 9,439,477
U.S. Pat. No. 9,516,923
U.S. Pat. No. 9,532,626
U.S. Pat. No. 9,532,893
U.S. Pat. No. 9,629,417
U.S. Pat. No. 9,681,705
U.S. Pat. No. 9,706,814
U.S. Pat. No. 9,737,115
U.S. Pat. No. 9,743,714
U.S. Pat. No. 9,770,070
U.S. Pat. No. 9,867,430
U.S. Pat. No. 9,872,790

All of these mechanisms require that a user bend over to tighten or loosen the shoe laces. Most also require two hands with manual dexterity to turn a reel dial or to operate a release lock.

Starting around 2016 a history of motorized reel based mechanisms appeared. For example reference some U.S. Patents from 2016 to 2018:
U.S. Pat. No. 9,339,082
U.S. Pat. No. 9,365,387
U.S. Pat. No. 9,578,926
U.S. Pat. No. 9,610,185
U.S. Pat. No. 9,629,418
U.S. Pat. No. 9,681,705
U.S. Pat. No. 9,693,605
U.S. Pat. No. 9,861,164

The motorized mechanisms with remote controls removed the bending over requirement. However they still required some manual dexterity to control a touch key or touch screen control to activate the motor or to unlock the mechanism.

In addition to the above mentioned patents some other prior art is mentioned below in more detail:

U.S. Pat. No. 1,481,903 is a device that allows the user to manually pull the laces upwards to tighten the laces, as done without the device. However the device incorporates a locking mechanism that does not allow the laces to loosen. Then a bow knot is manually tied, as done without the device. The invention removes the tension of the tightened laces on the knot thus decreasing the chance of the knot coming untied. The invention requires the user to bend over to tighten the laces and to tie the bow knot. This requirement is eliminated in the present invention.

U.S. Pat. No. 4,967,454 is a system and method that is a simple squeeze lock to hold the laces at a desired tension. It eliminates the need of having to tie a bow knot.

However it requires a user to bend over, use two hands to pull the ends of the laces while squeezing the squeeze lock. The user also has to bend over to release the squeeze lock. The present invention eliminates the need for the user to bend over and use two hands with manual dexterity to squeeze the lock. Another issue is that the laces between the squeeze lock and the ends of the laces are left hanging. There is no retraction of the loose ends as in the present invention.

U.S. Pat. No. 6,588,078 titled "Shoelace Tying Device" is one of many simple devices that are incorporated into the laces with holes for the laces. One has to bend over and manually tie a bow knot and then pull the laces through a slot to lock the laces.

U.S. Pat. No. 7,841,631 is a complex rack and pinion shoelace tying device to assist a user with limited hand dexterity in forming a knot in a shoelace. The device would be impractical away from home, should the user need to tie his shoes. There appears to be a need of threading the aglets into the mechanism every time it is to be used which does require manual dexterity. There is no aid in untying the shoes.

US 20060168784 is a complex shoelace tying device that incorporates locking mechanisms to hold the laces once they are threaded through a number of passageways and manually pulled tight. Then a bow knot is manually tied, as done without the device. The invention requires the user to bend over to tighten the laces and to tie the bow knot. This requirement is eliminated in the present invention.

US 20110113606 is one of many simple devices that are incorporated into the laces with holes for the laces. The laces are crisscrossed through holes to add friction to ease the tension on the bow knot. A great deal of manual dexterity is required to pass the laces through the holes in the device. The user has to bend over and manually tie a bow knot with both hands.

US 20140290014 is a device and method for tightening shoe laces on a bobbin which is similar to the present invention. However one needs to bend over and manually turn a small button winder to tighten the laces. There is also a small "lock control switch", which the present invention eliminates. It requires two hands, one to pull the laces and the other to turn the tension dial. To untie the device one has to manually bend over and move the lock control switch to the OFF position and turn the dial. The present invention eliminates the need to bend over and the need to have the manual dexterity to move a small lock control switch and to turn a small dial.

U.S. Pat. No. 7,958,654 describes two pull cords, one for the upper portion of a foot covering and one for the bottom portion of the foot covering (a snow boot in this embodiment). It uses, what is commonly known as a Chinese handcuff (or Chinese finger trap) type locking mechanism as a lace lock to hold the tightened lace under tension. There is a separate release strap (or pull tab) to unlock the lace from the locking mechanism. One could easily extrapolate to one pull cord for shoes (not boots). There is no automatic return feature so the user has to bend over and tuck the pulled cord ends into pockets on the side of the boot.

With the exception of U.S. Pat. No. 7,958,654 the prior art requires the user to bend over, to tighten the shoes, and have sufficient manual dexterity to pass the laces through various passageways and tie a bow knot, and or operate a remote control all of which has been eliminated with the present invention. However, U.S. Pat. No. 7,958,654 which has pull cords does still require the user to bend over to pull the release tab to loosen or unlock the laces and to tuck in the pulled cord ends into pockets on the boot.

SUMMARY OF THE PRESENT INVENTION

The present invention is an apparatus and method for aiding a person to tighten the laces on various forms of wearing apparel.

In one embodiment, a pair of laced shoes may be tied with one hand and without having to bend over, to manipulate, to tie or even to touch the shoe laces.

In other embodiments, such as laced prosthetics and laced orthotics, the apparatus may be tied with one hand and without having to manipulate or tie the laces.

The apparatus consists of a housing to hold an arbor, the arbor to hold a winder and to hold a lace spool, the lace spool to hold the laces, the winder to tighten the laces on the lace spool. The apparatus is easily operated with one hand by pulling the winder pull cord towards the lace spool to engage it with the lace spool and then to tighten the laces. To loosen the laces one simply pulls the winder pull cord away from the lace spool to disengage the winder from the lace spool and release the tension on the laces.

For those folks who have a handicap that makes bending over and tying shoe laces difficult or those folk with only one hand, the user can use a long handled hook to grab the pull cord handle and pull it up and over the shoe to tighten the shoe laces. Therefore the present invention along with a long handled hook allows an impaired person to tighten and loosen his/her own shoes with one hand without having to bend over and without having to tie any knots in the shoe laces.

LEXICON OF TERMS apparatus housing—the frame and enclosure of the apparatus eyelet hook—the catches on the base of the apparatus housing designed to grab the eyelets in order to anchor the apparatus to the shoe or apparel winder—a conventional winder that rotates a rotary plate when the tightening pull cord is pulled but does not rotate the plate when the pull cord is released. The pull cord automatically retracts back into the winder when the pull cord handle is released. The rotary plate has teeth for engaging with the teeth receptors in the lace winding spool.

winder housing—the container that contains the conventional winder mechanism rotary disk—a rotatable plate that rotates in one direction only when the pull cord is pulled but does not rotate when the pull cord is released.

teeth —protrusions on the rotatable disk that enter the teeth receptors when an angular force is exerted on the pull cord in a direction toward the lace spool.

The teeth exit the teeth receptors when an angular force is exerted on the pull cord in a direction away from the lace spool.

teeth receptors—openings constructed to mate with the teeth when the pull cord on the winder is pulled in their direction causing the teeth to grab the lace grabbing spool and rotate it in the direction of rotary disk.

lace spool—the cylindrical object that holds the wound laces arbor axis—the center line of the arbor about which the lace spool and the rotatable disk rotates aglet holes—holes in the lace winder spool into which the shoe lace aglets are inserted clasp—a gripper that is designed and constructed to slide in one dimension on the apparatus housing clasp opening—an opening in the clasp to allow the pull cord to pass through spring lock—a flexible bar that holds the spring lock latch button spring latch lock button—the protrusion that snaps into the lock strike hook to lock the clasp in the locked position lock strike hook—a holder mounted on the apparatus housing that the spring latch lock button snaps into to hold the clasp in the locked position.

slide slot—an opening in the apparatus housing that allows the pull string to move along the apparatus housing when the clasp is slid along the apparatus housing.

arbor—a shaft that is mounted in the apparatus housing and rotatably holds the lace spool and allows the winder to move along the axis of the shaft pull cord—a cord that is pulled to rotate the rotatable disk. The cord is automatically retracted back into the winder when the cord is released pull cord handle—a handle on the end of the pull cord for grabbing and pulling the pull cord truncated circle opening—an opening in the center of the winder housing that mates with a flat section on the arbor that prevents the winder housing from rotating circular opening—an opening in the center of the lace spool that mates with the circular section on the arbor that allows the lace spool to rotate freely pull hook—a hook, typically on a long handle, that allows a person who has trouble bending over to grab the pull handle and pull the pull cord to tighten the shoe laces long handle—a handle, typically on a pull hook, that allows a person that has trouble bending over to grab the pull handle and pull the pull cord to tighten the shoe laces winder spool—a cylindrical object designed to hold the pull cord in the winder winder spring—a spring that stores potential energy when the pull cord is pulled and then uses that energy to automatically retract the pull cord back onto the winder spool when the pull cord is released aglet —sheath on the ends of a shoe lace shoe—a conventional shoe or orthotic device or prosthetic device that uses laces to be tighten

REFERENCE NUMERALS 100 apparatus housing
104 eyelet hook
107 winder
108 winder housing
110 rotary disk
112 teeth
114 teeth receptors
116 lace spool
118 arbor axis
120 aglet holes
130 clasp
132 clasp opening
134 spring lock
136 spring lock latch button
138 lock strike hook
139 slide slot
140 arbor
142 pull cord
143 pull cord handle base
144 pull handle
147 opening for the pull cord
150 circular opening
190 truncated circle opening
200 pull hook
210 long handle
300 winder spool
310 winder spring
320 aglet
410 laced shoe
420 laced orthotic or prosthetic
430 laces

DETAILED DESCRIPTION OF THE PRESENT INVENTION

Referring now in greater detail to the drawings in which numerals indicate like parts through several views.

Figure 1A:
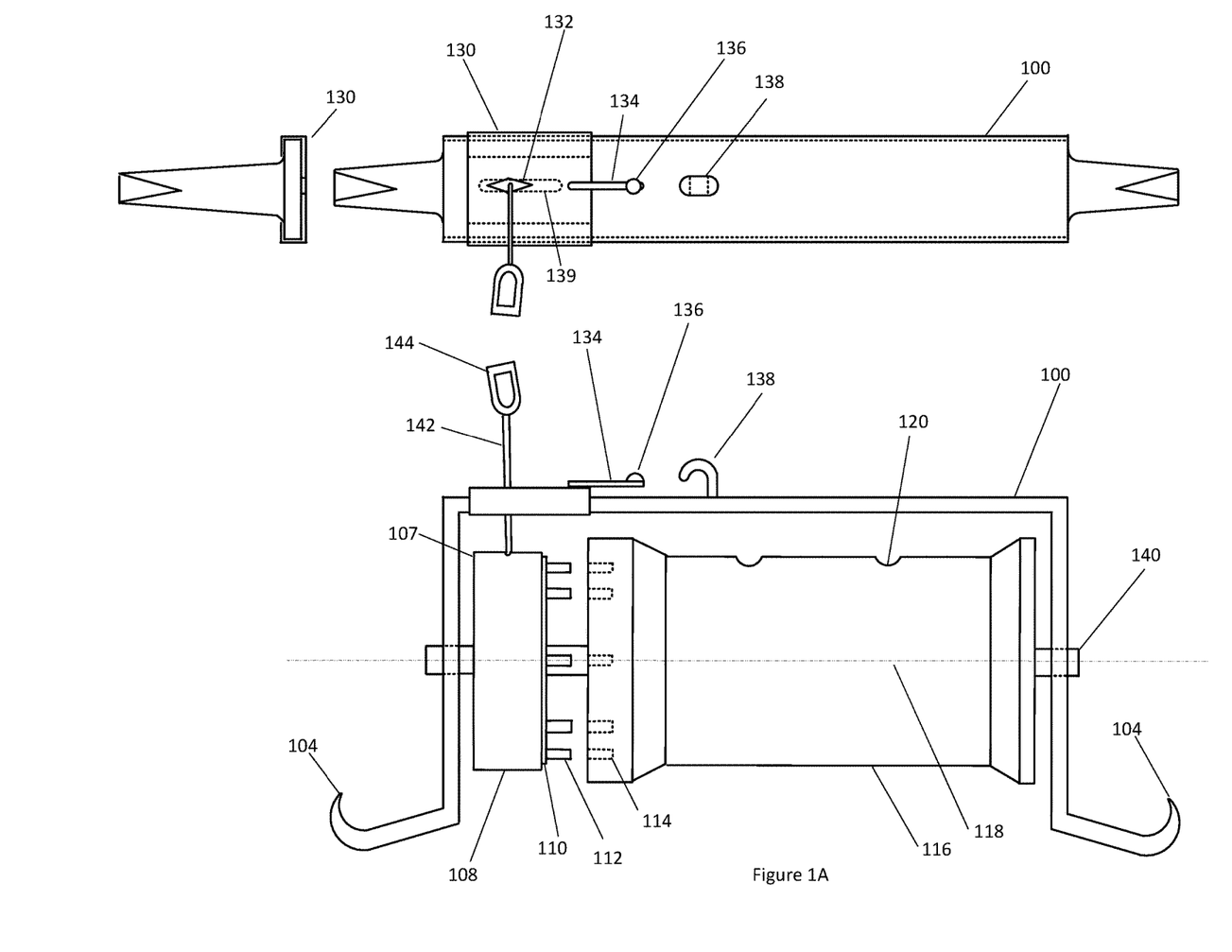
FIG. 1A is a side, end and top view sketch of the apparatus in the opened position.

FIG. 1A is a side, end and top view sketch of the apparatus in the opened position. The apparatus housing 100 holds a fixed arbor 140. A lace spool 116 rides on the arbor and is able to rotate on the arbor axis 118 but not to slide. A winder 107 also rides on the arbor with its winder housing 108 allowed to slide but not to rotate. The apparatus housing has at least two eyelet hooks 104 for anchoring the apparatus to the top of a shoe by inserting the eyelet hooks 104 through the shoe eyelets. The lace aglets are then inserted into the aglet holes 120. The apparatus housing also has a clasp 130 that is able to slide on the apparatus housing. The clasp has a clasp opening 132. The clasp has an attached spring lock 134. The apparatus housing has a lock strike hook 138 to hold the clasp in a closed position when the spring lock latch button 136, on the spring lock, is slid under the lock strike hook. The winder has a pull cord 142 with a pull cord handle 144 for rotating the rotary disk 110. The rotary disk has teeth 112 which rotate with the rotary disk. The pull cord and the pull cord handle is installed through the slide slot 139 and the clasp opening 132. The clasp opening is approximately diamond shaped. It is so designed to cause the pull cord to be pinched by the acute angle of the opening when the pull cord is pulled toward the lace spool. This causes the clasp to slide toward the lace spool pulling with it the winder. When the winder contacts the lace spool it rotates until the teeth enter the teeth receptors 114 in the lace spool. When that occurs, the spring lock latch button 136 slides under the lock strike hook 138 and that holds the winder teeth in the teeth receptors in the closed position. Now when the pull angle, on the pull cord, is changed to upward, perpendicular to the clasp, the rotary disk and the teeth causes the lace spool 116 to rotate and wind, or tighten the laces.

Figure 1B:
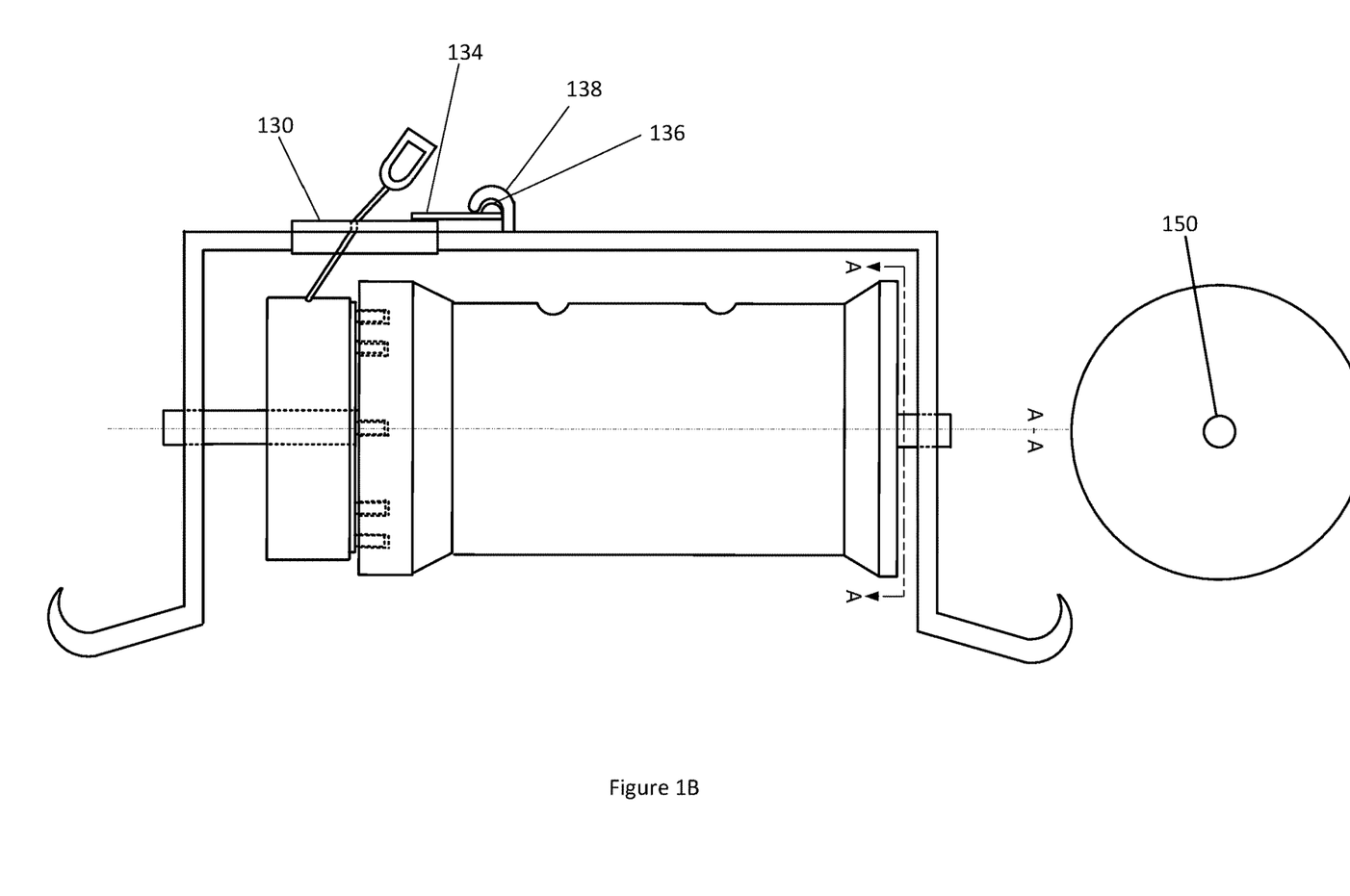
FIG. 1B is a side and cross-section view sketch of the apparatus in the closed position.

FIG. 1B is side and cross section view sketch of the apparatus in the closed position. In this position the lace spool rotates when the pull cord is pulled. When the pull cord is released it is automatically retracted back into the winder so that no cords, or laces, are hanging anywhere on the shoe. The winder housing is locked in the closed position with the spring lock latch button 136, on the spring lock 134, is caught under the lock strike hook 138. This causes the laces to remain under tension while the shoes, or prosthetics, or orthotics are being worn.

Figure 2:
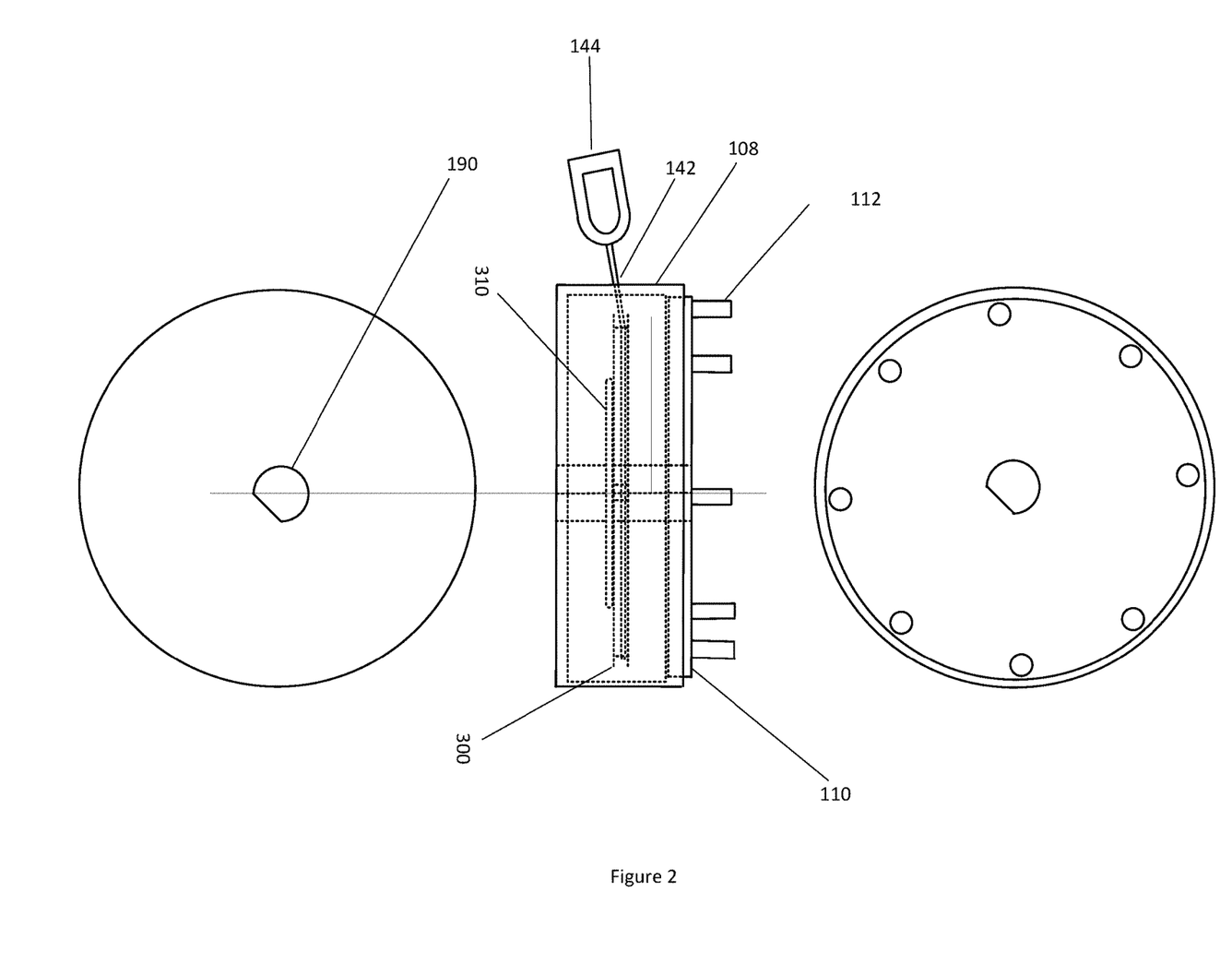
FIG. 2 is a side, top and bottom view sketch of the winder.

FIG. 2 is a sketch of the winder housing 108. It shows the rotator disk 110, the teeth 112, a winder spool 300, a pull cord 142, a pull cord handle 144, a winder spring 310, and a truncated circle opening 190 for the winder to ride on a flat surface of the arbor to keep the winder housing 108 from rotating.

Figure 3:
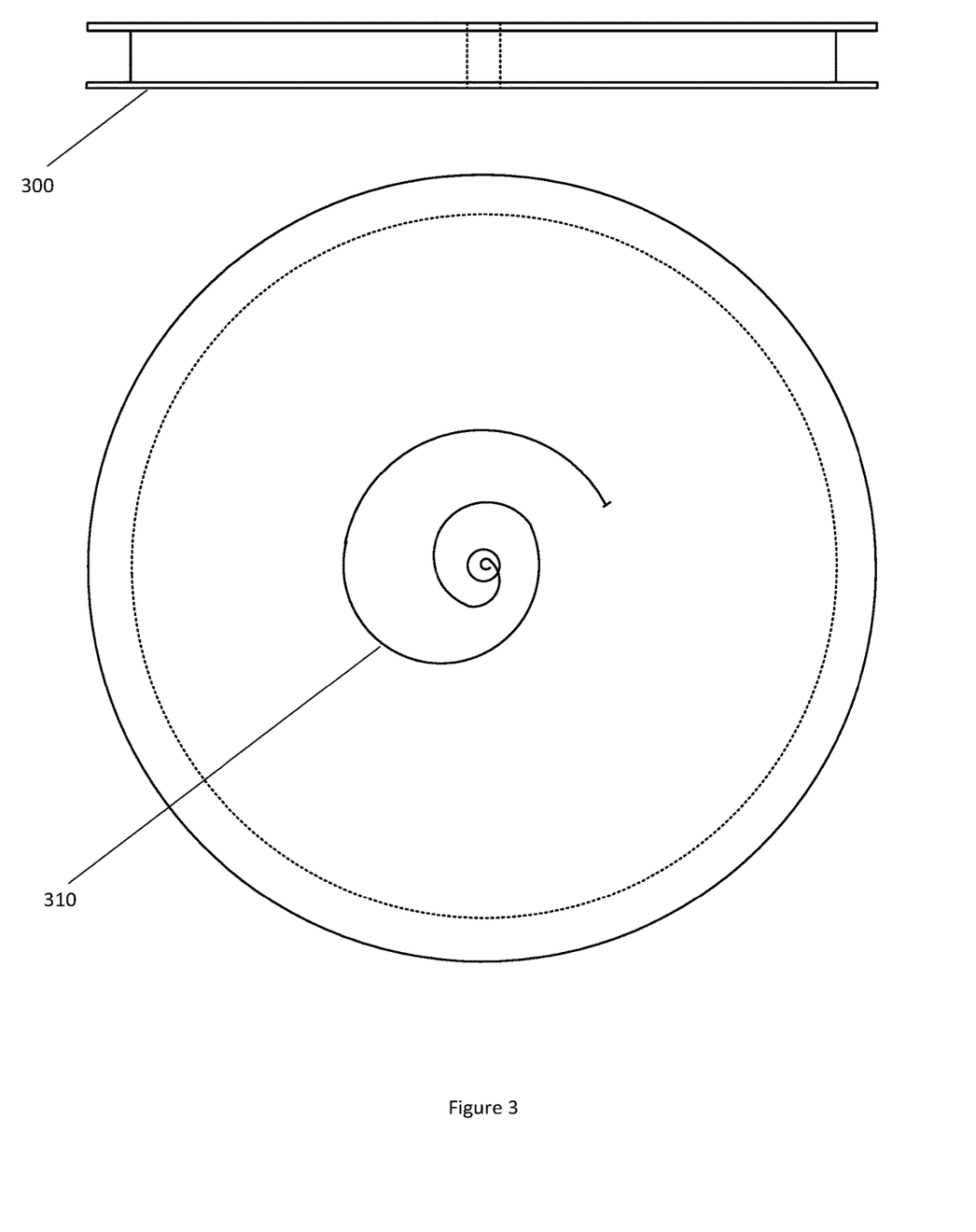
FIG. 3 is a side and top view of the winder spool and the winder spring.

FIG. 3 is a sketch of the winder spool 300 which holds the pull cord and the winder spring 310 which causes the pull cord to automatically retract when released.

Figure 4A:
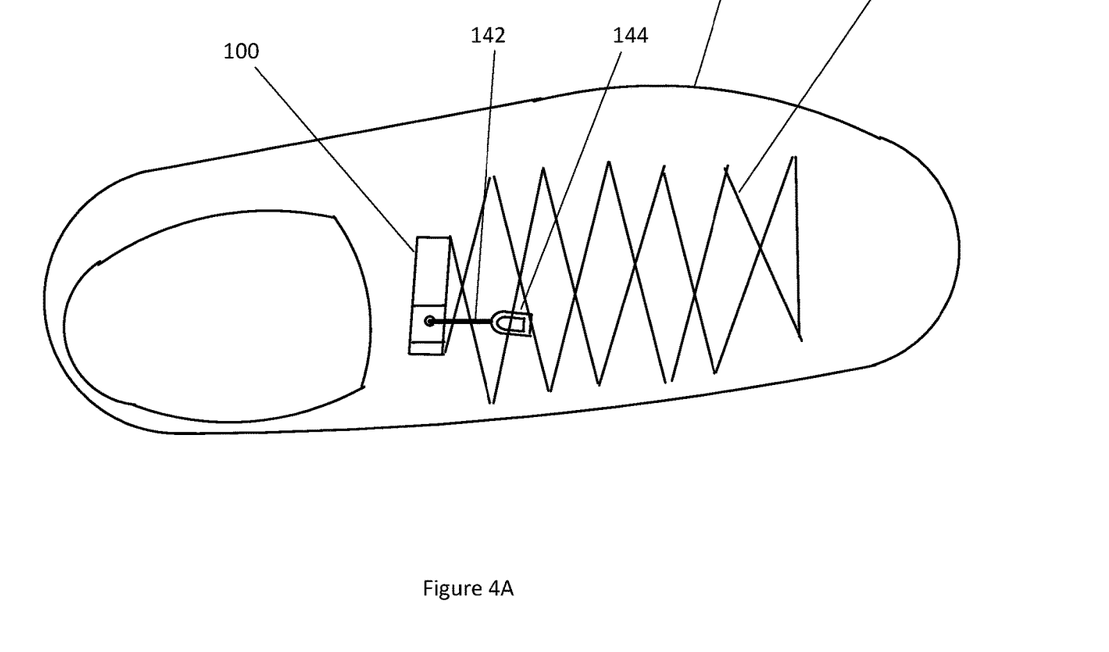
FIG. 4A is a perspective sketch of one embodiment of the apparatus, a shoe lace tightener fastener.
Figure 4B:
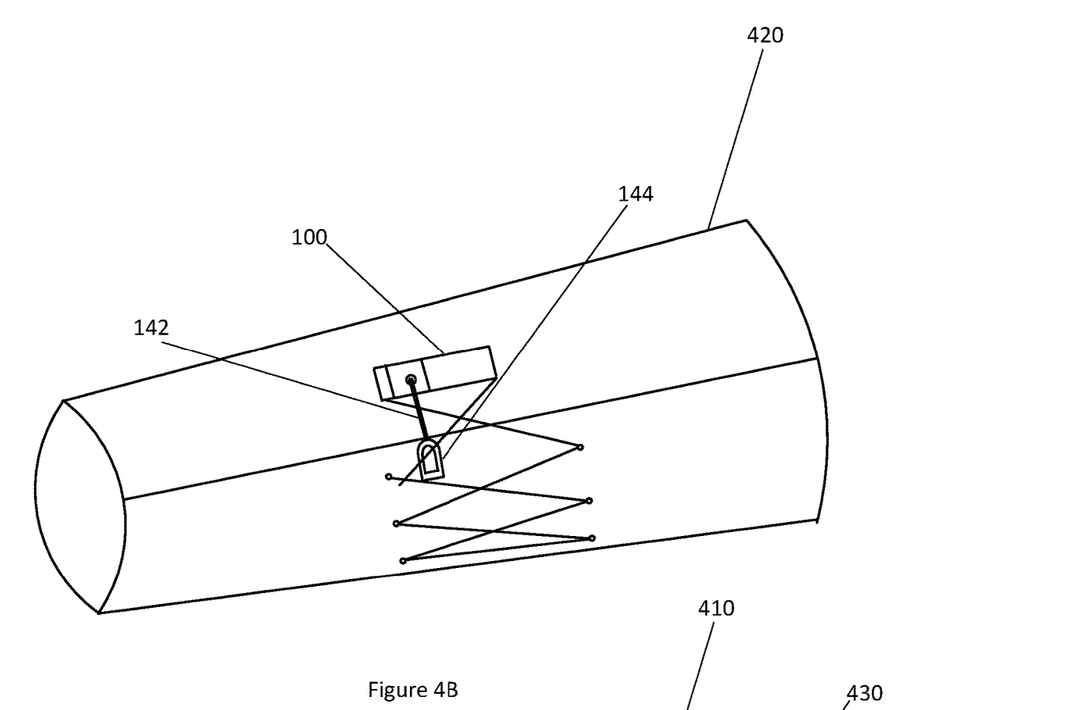
FIG. 4B is a perspective sketch of another embodiment of the apparatus, a prosthetics fastener.

FIG. 4A is a sketch showing the apparatus housing 100 with the pull cord 142 and pull cord handle 144 mounted on top of a shoe 410 with laces 430. FIG. 4B is a sketch showing the apparatus housing 100 with the pull cord 142 and the pull cord handle 144 mounted on top of a prosthetic or orthotic 420.

Figure 5:
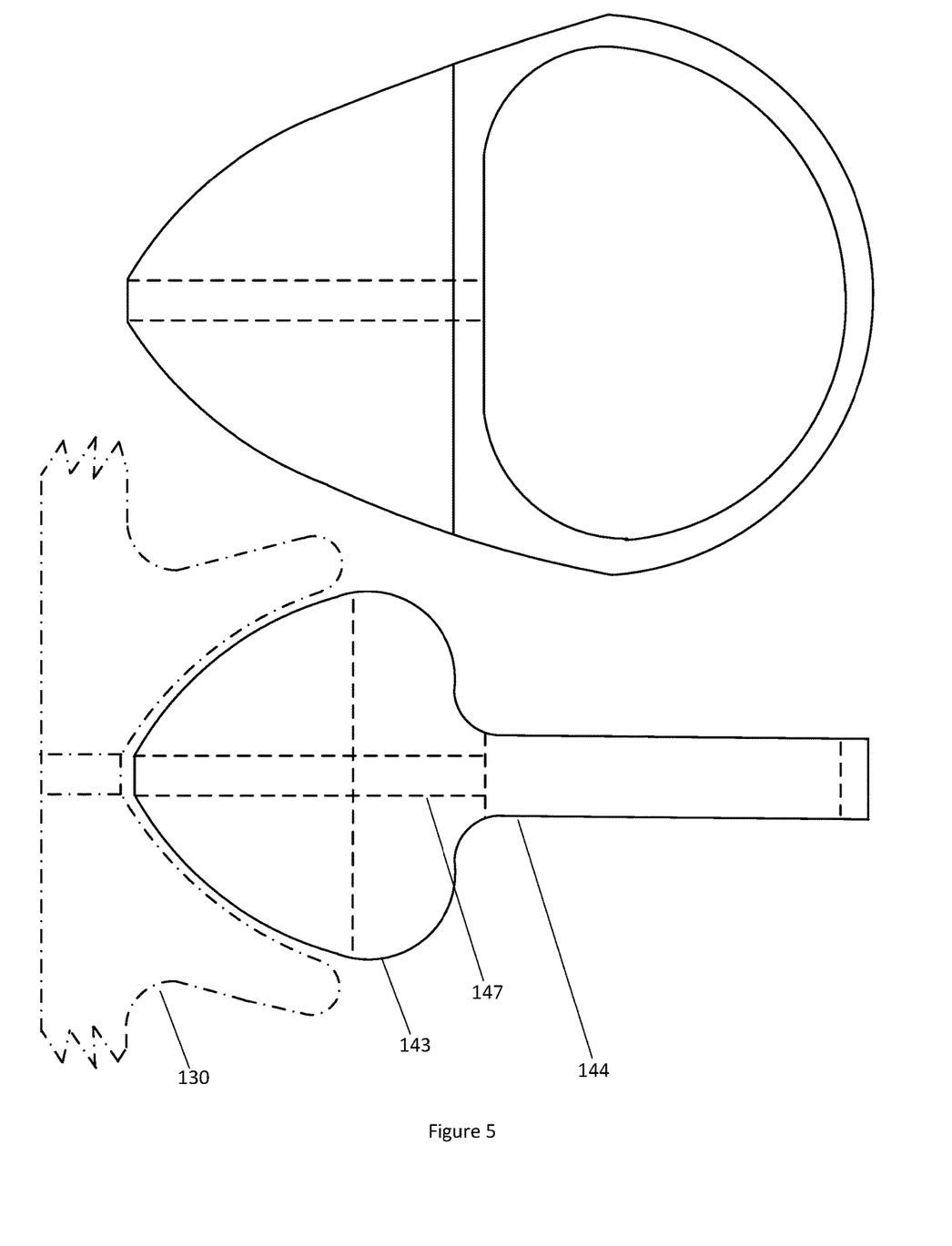
FIG. 5 shows two side views of the pull handle with its heart shaped base cross section. The mating heart shaped center section of the clasp opening is shown with dot-dash lines.

FIG. 5 shows two sides of the pull handle with a heart shaped base cross section that mates with a heart shaped cross opening in the middle portion of the clasp opening to cause the pull handle to remain in an approximately perpendicular (to the clasp) position when the pull cord is retracted for easy grabbing by a finger or a hook.

Figure 6:
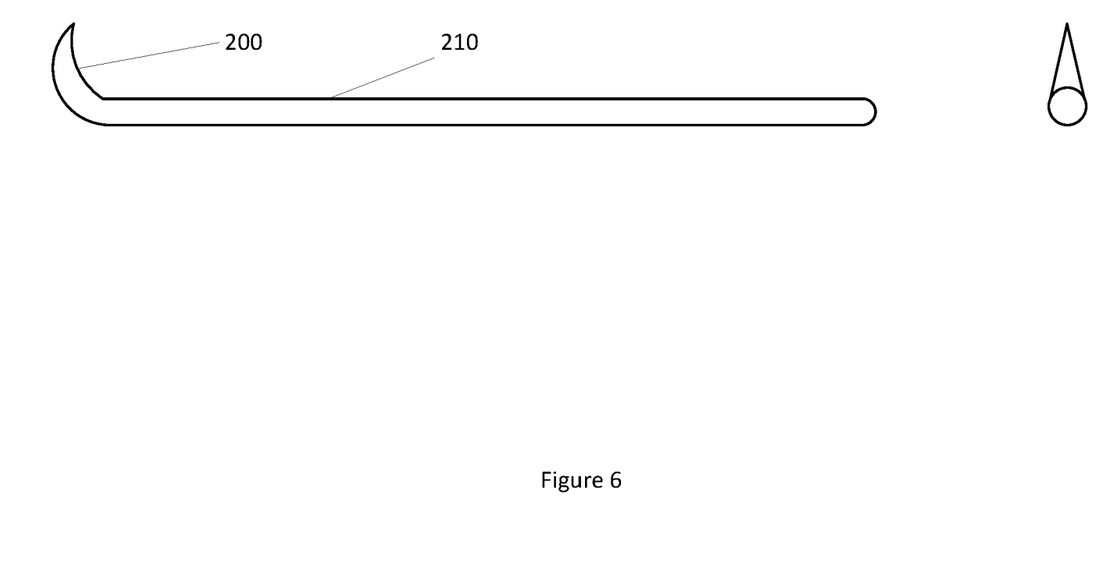
FIG. 6 is a side and end view sketch of a long handled hook.

FIG. 6 is a side and end view sketch of a long handled 210 and pull hook 200.

Figure 7A:
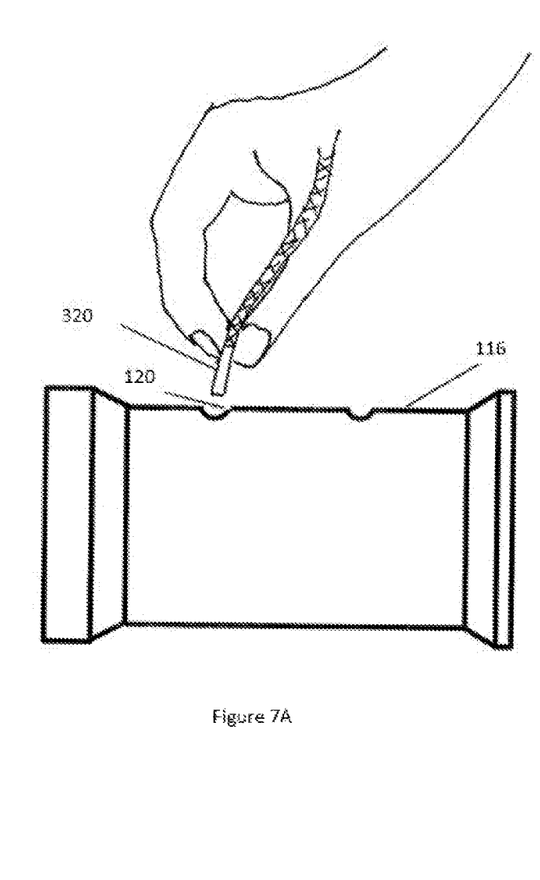
FIG. 7A is a sketch of a person starting to insert an aglet into an aglet hole

FIG. 7A shows a human hand about to insert the aglet 320, on a shoe string, into one of the aglet holes 120 in the lace spool 116.

Figure 7B:
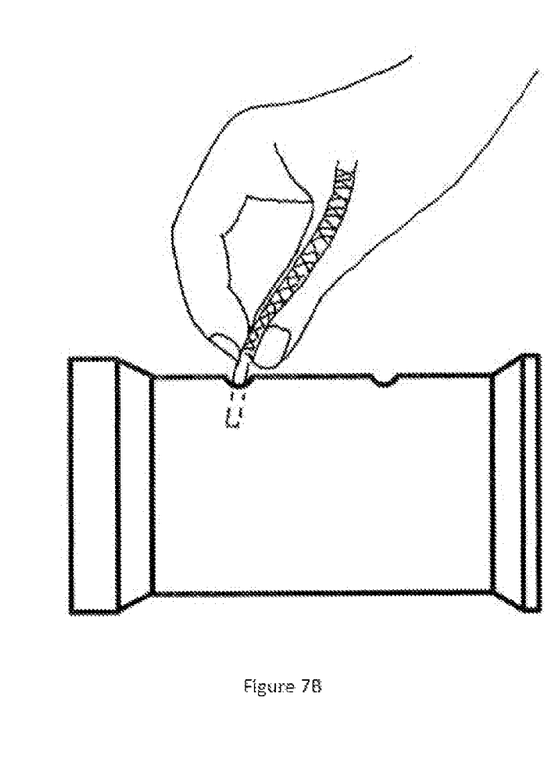
FIG. 7B is a sketch of a person inserting an aglet into an aglet hole

FIG. 7B shows a human hand inserting the aglet 320, on a shoe string, into one of the aglet holes 120 in the lace spool 116. The aglet should fit firmly into the aglet hole.

Operation of the Present Invention

The initial set up of the apparatus for shoes starts with slipping the eyelet hooks of the apparatus housing into the eyelets closest to where the bow would have been tied in order to anchor the apparatus in place on the shoe. The next step is to insert the shoe lace aglets into the aglet holes in the lace spool. Some slack, in the shoe laces, may be taken up by pulling on the tightening pull cord. To put a shoe on a foot, one needs to first insert the toes into the foot opening with the apparatus in the open position and then slide the heel into the shoe. The next action is to grab the pull cord handle and pull it towards the lace spool. This action slides the winder towards the lace spool thereby engaging the teeth into the teeth receptors which then rotates the lace spool causing the laces to tighten. The spring lock then locks the apparatus in the closed position. The pull cord handle is then pulled until the desired tension is reached. The pull cord is then retracted onto the rotary disk. The shoes are then worn with the apparatus in the closed position. Once the apparatus is set up it can remain in the shoes while they are being worn (in the closed position) or stored (in the open position).

To remove the shoes, one simply grabs pull cord handle, with one hand or with a long handled hook, and pull it away from the lace spool. This action slides the clasp, the spring lock, away from the lace spool changing the apparatus from the closed position to the open position.

The initial set up for orthotic devices or prosthetic devices is the same as for shoes.

The pull cord automatically retracts into the winder, when the pull cord handle is released, so that no cord or lace is hanging outside the apparatus.

Thus a child, a handicapped person or an elderly person can tighten shoes or prosthetics or orthotics with one hand, and if using a long handled hook, can do so without even bending over.

CONCLUSION

The present invention is an apparatus and method for the tightening of shoe laces (or prosthetic laces or orthotic laces) by anyone, including a child, an elderly person or a handicapped person who is not able to bend over and reach their feet with their hands and to easily tie their own laces. The pull cord automatically retracts into the winder so that no cord is hanging outside the apparatus. Even an able bodied person can fasten, or tighten, his/her shoes faster than the current process takes.

I claim:

1. An apparel tightening and loosening apparatus, an apparel having laces, the apparel having eyelets, the eyelets for lacing the laces, the apparatus comprising:
   a) an apparatus housing, the apparatus housing having at least two eyelet hooks, the eyelet hooks for anchoring the apparatus housing on the apparel when the eyelet hooks are inserted into the eyelets, the apparatus housing having a clasp, the clasp having an opened position and a closed position, the clasp able to controllably slide on the apparatus housing between the opened position and the closed position, the clasp having a clasp opening, the clasp having a spring lock, the spring lock having a spring lock latch button, the apparatus housing having a lock strike hook, the apparatus housing having a slide slot, the spring lock latch button designed and constructed to snap into the lock strike hook when the clasp is slid toward the lock strike hook, thereby holding the clasp in the closed position, the spring lock latch button designed and constructed to snap out of the lock strike hook when the clasp is slid away from the lock strike hook, thereby moving the clasp to the opened position,
   b) a winder, the winder having a winder housing, the winder having a pull cord, the pull cord for insertion through the slide slot, the pull cord for insertion through the clasp opening, the winder having an opened position and a closed position, the winder designed and constructed to move to the closed position when the pull cord urges the clasp to slide to the closed position, the winder designed and constructed to move to the opened position when the pull cord urges the clasp to slide to the opened position, the winder having a rotary disk, the winder having a winder spool, the winder having a winder spring attached to the winder spool, the winder spring attached to the winder housing, the winder spool attached to the rotary disk, the pull cord having a first end, the pull cord having a second end, the pull cord having a pull cord handle attached to the first end of the pull cord, the second end of the pull cord attached to the winder spool, the rotary disk designed and constructed to be rotated when the pull cord is pulled, the rotary disk designed and constructed to automatically rewind the pull cord when the pull cord is released, the rotary disk having teeth,
   c) a lace spool, the lace spool having at least two aglet holes, the aglet holes for holding ends of the laces, the lace spool having teeth receptors, the teeth receptors designed and constructed to hold the teeth when the teeth are inserted into the teeth receptors, the teeth are inserted into the teeth receptors when the winder housing is in the closed position, whereby the lace spool will rotate when the teeth on the rotary disk have been inserted into the teeth receptors in the lace spool and when the pull cord is pulled, thus tightening the laces,
   d) an arbor, the arbor having an arbor axis, the arbor mounted in the apparatus housing, the arbor designed and constructed for slidably holding the winder housing, the arbor designed and constructed to prevent the winder housing from rotating around the arbor axis, the arbor for holding the lace spool, the arbor designed and constructed to prevent the lace spool from sliding on the arbor axis, the winder housing able to slide on the arbor axis, the lace spool able to rotate on the arbor axis, whereby, tension on the laces is controlled by positioning the winder, the tension increased when the winder is in the closed position and the pull cord is pulled, the tension released when the winder is in the opened position, the opened position allowing the apparel to be removed, whereby a handicapped person is able to fasten and control the tension on the laces using only one hand.

2. The apparatus of claim 1 wherein the pull cord is pullable by a conventional hook with an extended handle whereby the apparatus is able to be operated by the handicapped person with one hand and without having to bend over.

3. The apparatus of claim 1 wherein the clasp opening has a diamond shape, the diamond shape having a gradually tapered end closest to the lock strike hook, the tapered end for pinching the pull cord when the pull cord is pulled toward the lock strike hook, the pinching to urge the clasp and the winder housing to enter the closed position, the diamond shape having a gradually tapered end furthest from the lock strike hook, the tapered end for pinching the pull cord when the pull cord is pulled away from the lock strike hook, the pinching to urge the clasp and the winder housing to enter the opened position.

4. The apparatus of claim 1 wherein the pull cord handle has a base, the base having a heart shaped cross section, a center portion of the clasp opening having a heart shaped opening, the heart shaped of the base designed and constructed to mate with the heart shaped of the clasp opening, a mating designed to urge the pull cord handle to be approximately perpendicular to the clasp when the pull cord is retracted into the winder housing, the pull cord handle is perpendicular for easy grabbing with a finger or with a hook.

5. A method for an apparel tightening and loosening apparatus, an apparel having laces, the apparel having eyelets, the eyelets for lacing the laces, the laces having aglets, the method comprising:

a) providing an apparatus housing, the apparatus housing having at least two eyelet hooks, the eyelet hooks for anchoring the apparatus housing on the apparel when the eyelet hooks are inserted into the eyelets, the apparatus housing having a clasp, the clasp having an opened position and a closed position, the clasp able to controllably slide on the apparatus housing between the opened position and the closed position, the clasp having a clasp opening, the clasp having a spring lock, the spring lock having a spring lock latch button, the apparatus housing having a lock strike hook, the apparatus housing having a slide slot, the spring lock latch button designed and constructed to snap into the lock strike hook when the clasp is slid toward the lock strike hook, thereby holding the clasp in the closed position, the spring lock latch button designed and constructed to snap out of the lock strike hook when the clasp is slid away from the lock strike hook, thereby moving the clasp to the opened position, b) providing a winder, the winder having a winder housing, the winder having a pull cord, the pull cord for insertion through the slide slot, the pull cord for insertion through the clasp opening, the winder having an opened position and a closed position, the winder designed and constructed to move to the closed position when the pull cord urges the clasp to slide to the closed position, the winder designed and constructed to move to the opened position when the pull cord urges the clasp to slide to the opened position, the winder having a rotary disk, the winder having a winder spool, the winder having a winder spring attached to the winder spool, the winder spring attached to the winder housing, the winder spool attached to the rotary disk, the pull cord having a first end, the pull cord having a second end, the pull cord having a pull cord handle attached to the first end of the pull cord, the second end of the pull cord attached to the winder spool, the rotary disk designed and constructed to be rotated when the pull cord is pulled, the rotary disk designed and constructed to automatically rewind the pull cord when the pull cord is released, the rotary disk having teeth, c) providing a lace spool, the lace spool having at least two aglet holes, the aglet holes for holding ends of the laces, the lace spool having teeth receptors, the teeth receptors designed and constructed to hold the teeth when the teeth are inserted into the teeth receptors, the teeth are inserted into the teeth receptors when the winder housing is in the closed position, whereby the lace spool will rotate when the teeth on the rotary disk have been inserted into the teeth receptors in the lace spool and when the pull cord is pulled, thus tightening the laces, d) providing an arbor, the arbor having an arbor axis, the arbor mounted in the apparatus housing, the arbor designed and constructed for slidably holding the winder housing, the arbor designed and constructed to prevent the winder housing from rotating around the arbor axis, the arbor for holding the lace spool, the arbor designed and constructed to prevent the lace spool from sliding on the arbor axis, the winder housing able to slide on the arbor axis, the lace spool able to rotate on the arbor axis, whereby, tension on the laces is controlled, by positioning the winder the tension increased when the winder is in the closed position and the pull cord is pulled, the tension released when the winder is in the opened position, the opened position allowing the apparel to be removed, whereby a person is able to fasten and control the tension on the laces using only one hand, e) inserting the aglets into the aglet holes, f) pulling the pull cord handle toward the lace spool for urging the winder to slide towards the lace spool, thereby urging the teeth to enter the teeth receptors, thereby causing the spring lock to hold the apparatus in the closed position, g) pulling the pull cord upwards for rotating the lace spool causing the laces to tighten, whereby an elderly person or a handicapped person who is not able to bend over and reach the laces with their hands or who does not have manual dexterity to tie the laces or a child who has not learned to tie the laces or to tighten the laces, h) pulling the pull cord handle away from the lace spool for urging the winder to slide away from the lace spool, for urging the teeth to exit the teeth receptors, causing the apparatus to enter the opened position and releasing the tension in the laces, whereby the elderly person or the handicapped person who is not able to bend over and reach the laces with their hands or who does not have the manual dexterity to untie the laces to remove the apparel by loosening the laces using only the one hand.

6. The method of claim 5 wherein the pull cord is pullable by a conventional hook with an extended handle whereby the apparatus is able to be operated by the handicapped person with one hand and without having to bend over.

7. The method of claim 5 wherein the clasp opening has a diamond shape, the diamond shape having a gradually tapered end closest to the lock strike hook, the tapered end for pinching the pull cord when the pull cord is pulled toward the lock strike hook, the pinching to urge the clasp and the winder housing to enter the closed position, the diamond shape having a gradually tapered end furthest from the lock strike hook, the tapered end for pinching the pull cord when the pull cord is pulled away from the lock strike hook, the pinching to urge the clasp and the winder housing to enter the opened position.

8. The method of claim 5 wherein the pull cord handle has a base, the base having a heart shaped cross section, a center portion of the clasp opening having a heart shaped opening, the heart shaped of the base designed and constructed to mate with the heart shaped of the clasp opening, a mating designed to urge the pull cord handle to be approximately perpendicular to the clasp when the pull cord is retracted into the winder housing, the pull cord handle is perpendicular for easy grabbing with a finger or with a hook.

* * * * *